United States Patent Office 3,422,120
Patented Jan. 14, 1969

3,422,120
1,1 - BIS(3,4 - METHYLENEDIOXYPHENYL)-2-METHYL-3-(TERT-AMINO)PROPANOLS AND DERIVATIVES THEREOF
Robert Bruce Moffett, Kalamazoo, Mich., assignor to The Upjohn Company, Kalamazoo, Mich., a corporation of Delaware
No Drawing. Filed May 10, 1966, Ser. No. 548,877
U.S. Cl. 260—340.5      2 Claims
Int. Cl. C07d *13/10*

This invention relates to new and useful chemical compounds and more particularly, to 1,1-bis(3,4-methylenedioxyphenyl)-2-methyl-3-(tert-amino)propanols and the acid addition salts thereof.

The 1,1-bis(3,4-methylenedioxyphenyl)-2 - methyl-3-(tert-amino)propanols of the present invention are represented by the formula:

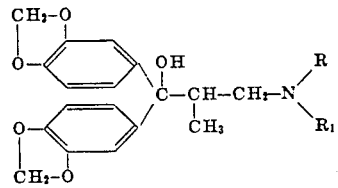

Formula I wherein R and $R_1$ taken separately are alkyl having from 1 to 4 carbon atoms, inclusive, and taken together with —N< constitute a saturated heterocyclic amino radical selected from the group consisting of pyrrolidino, piperidino, morpholino, or N-methylpiperazino.

In the preceding Formula I, examples of alkyl having from 1 to 4 carbon atoms, inclusive, are methyl, ethyl, propyl, butyl, and isomeric forms thereof.

Compounds of the Formula I can be prepared by reacting 3,4-methylenedioxyphenyllithium with an alkyl 2-methyl-3-(tert-amino)-propionate (preferably a methyl or ethyl ester) in an anhydrous solvent system, e.g., diethyl ether, diisopropyl ether, dibutyl ether, tetrahydrofuran and the like; decomposing the reaction mixture in a conventional manner such as by pouring the mixture into acidified ice water, e.g., hydrobromic or hydrochloric acid, and collecting the acid addition salt. The free base can be obtained by dispersing the acid addition salt in water and basifying the solution, e.g., with sodium hydroxide. The free base can be purified by conventional procedures such as by recrystallization from a suitable solvent, e.g., 2-propanol, ethanol, acetone, methyl ethyl ketone, methylcyclohexane, and the like.

3,4-methylenedioxyphenyllithium can be prepared as described by Gensler and Stouffer, J. Org. Chem. 23, 908 (1958) and by Pettit and Alkalay, J. Org. Chem. 25, 1363 (1960).

The alkyl 2-methyl-3-(tert-amino)propionates employed in the foregoing synthesis can themselves be prepared in accordance with known procedures, for example, by condensing a secondary amine of the formula:

wherein R and $R_1$ are as defined before, with an alkyl (preferably methyl or ethyl) methacrylate. See Perrine, J. Org. Chem. 18, 898 (1953) and Vystrcil et al., Chem. Listy 44, 262 (1950).

Acid addition salts of compounds of the Formula I can be prepared by neutralization of the free base with the appropriate amount of an inorganic or organic acid, examples of which are hydrochloric, hydrobromic, sulfuric, nitric, prosphoric, acetic, lactic, benzoic, salicylic, glycolic, succinic, tartaric, maleic, malic, pamoic, cyclohexanesulfamic, citric and methanesulfonic acids, and like acids. The neutralization can be carried out by a variety of procedures known to the art to be generally useful for the preparation of amine acid addition salts. The choice of the most suitable procedure will depend on a variety of factors, including convenience of operation, economic considerations, and particularly the solubility characteristics of the particular free base, the acid, and the acid addition salt. If the acid is soluble in water, the free base can be dissolved in water containing an equivalent amount of the acid, and thereafter, the water can be removed by evaporation; in some instances, the salt precipitates from the aqueous solution, particularly when cooled, and evaporation is not necessary. If the acid is soluble in a relatively non-polar solvent, for example, diethyl ether or diisopropyl ether, separate solutions of the acid and free base in such a solvent can be mixed in equivalent amounts, whereupon the acid addition salt will usually precipitate because of its relatively low solubility in the non-polar solvent. Alternatively, the free base can be mixed with an equivalent amount of the acid in the presence of a solvent of moderate polarity, for example, a lower alkanol, a lower alkanone, or a lower-alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. These acid addition salts are useful for upgrading the free bases.

The compounds of the Formula I, including the free bases and acid addition salts, have anti-inflammatory activity. For example, 1,1-bis(3,4-methylenedioxyphenyl)-2-methyl-3-diethylamino-propanol when administered orally at a dose of 45 mg. per kg. gives 37% inhibition of inflammation as shown by the hind paw edema test in rats.

Additionally, the compounds of the Formula I have diuretic and CNS stimulating activity. 1,1-bis(3,4-methylenedioxyphenyl)-2-methyl-3 - diethylaminopropanol produces mild to excellent diuretic response in rats at oral dosages of 5 and 20 mg. per kg. respectively.

The free bases of the Formula I form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,-155.

The free bases of this invention also form salts with penicillins. These salts have solubility characteristics which cause them to be useful in the isolation and purification of penicillins, particularly benzyl penicillin. Said salts can be formed either by neutralization of the free base form of a compound of Formula I, with the free acid form of a penicillin, or by a methathetical exchange of the anion of an acid addition salt of a Formula I compound, for example the chloride ion of a hydrochloride, with the anionic form of a penicillin.

The novel free bases of Formula I are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The following examples illustrate the best mode contemplated by the inventor for carrying out the invention, but are not to be construed as limiting the scope thereof.

EXAMPLE I

*1,1-bis(3,4 - methylenedioxyphenyl) - 2-methyl-3-diethylaminopropanol*

A solution of 162.8 g (0.81 mole) of 3,4-methylenedioxybromobenzene in 500 ml. of absolute ether was cooled to −50° C. and 500 ml. (0.8 mole) of 15% butyllithum in hexane was added during 20 min. at −40 to −50° C. After stirring at −50° C. for 20 min., a solution of 34.6 g. (0.2 mole) of methyl 2-methyl-3-diethylaminopropionate in 100 ml. of absolute ether was slowly added. The mixture was stirred at −50° C. for 20 min., allowed to slowly warm to room temperature, and then refluxed for 3 hours. After standing overnight, it was poured into ice water containing 1 mole of hydrogen bromide, giving a dark gum which dissolved on adding more water and ether. The aqueous layer was washed with ether and basified with sodium hydroxide, giving a dark oil; the mixture was extracted with ether. The ether extract was washed with water and saturated sodium chloride solution and dried over sodium sulfate. Filtration and removal of the ether gave 79 g. of dark syrup which partly crystallized on long standing. The mixture was recrystallized from 450 ml. of 2-propanol (with decolorizing charcoal treatment), giving 51.2 g. (66.5%) of crystalline 1,1-bis(3,4-methylenedioxyphenyl)-2-methyl-3-diethylaminopropanol, M.P. 97–99° C. Recrystallization from methylcyclohexane did not raise the melting point.

*Analysis.*—Calc'd for $C_{22}H_{27}NO_5$: C, 68.55; H, 7.06; N, 3.63. Found: C, 67.85; H, 6.86; N, 3.76.

By reacting 1,1-bis(3,4-methylenedioxyphenyl)-2-methyl-3-diethylaminopropanol with acids such as hydrochloric, hydrobromic, sulfuric, nitric, phosphoric, acetic, lactic, benzoic, salicylic, glycolic, succinic, tartaric, malic, pamoic, cyclohexanesulfamic citric, and methanesulfonic acids, the corresponding acid addition salts can be obtained.

EXAMPLE II

Following the procedure of the preceding Example 1, but substuting an equivalent amount each of methyl 2-methyl-3-(isopropylmethylamino)propionate, methyl 2-methyl-3-diisobutylaminopropionate, methyl 2-methyl-3-diisobutylaminopropionate, methyl 2-methyl-3-dimethylaminopropionate, methyl 2-methyl-3-pyrrolidinopropionate, methyl 2-methyl-3-piperdinopropionate, methyl 2-methyl-3-morpholinopropionate, and methyl 2-methyl-3-(N-methyl-piperazino)propionate for the methyl 2-methyl-3-diethylamino-propionate of the example, there can be obtained:

1,1-bis(3,4-methylenedioxyphenyl)-2-methyl-3-(isopropylmethylamino)propanol,
1,1-bis(3,4-methylenedioxyphenyl)-2-methyl-3-dibutylaminopropanol,
1,1-bis(3,4-methylenedioxphenyl)-2-methyl-3-diisobutylaminopropanol,
1,1-bis(3,4-methylenedioxyphenyl)-2-methyl-3-dimethylaminopropanol,
1,1-bis(3,4-methylenedioxyphenyl)-2-methyl-3-pyrrolidinopropanol,
1,1-bis(3,4-methylenedioxyphenyl)-2-methyl-3-piperidinopropanol,
1,1-bis(3,4-methylenedioxyphenyl)-2-methyl-3-morpholinopropanol, and
1,1-bis(3,4-methylenedioxyphenyl)-2-methyl-3-(N-methylpiperazino)propanol, respectively.

What is claimed is:
1. A compound of the formula

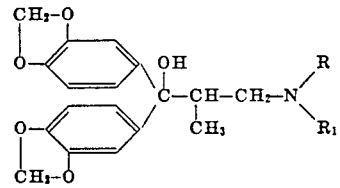

wherein R and $R_1$ taken separately are alkyl having from 1 to 4 carbon atoms, inclusive, and taken together with —N< constitute a saturated heterocyclic amino radical selected from the group consisting of pyrrolidino, piperizino, morpholino and N-methyl-piperazino, and the acid addition salts thereof.

2. A compound of claim 1 wherein R and $R_1$ are ethyl, and the compound is 1,1-bis(3,4-methylenedioxyphenyl)-2-methyl-3-diethylaminopropanol.

References Cited

UNITED STATES PATENTS 1,964,973  7/1934  Bockmühl et al. _ 260—340.5 X
2,765,307  10/1956  Schmidle _____ 260—340.5 X

FOREIGN PATENTS 963,304  7/1964  Great Britain.

NICHOLAS S. RIZZO, *Primary Examiner.*

JAMES H. TURNIPSEED, *Assistant Examiner.*

U.S. Cl. X.R.

252—149; 260—239.1, 243, 247.7, 268, 294.7, 326.8; 269—999

UNITED STATES PATENT OFFICE
CERTIFICATE OF CORRECTION

Patent No. 3,422,120

January 14, 1969

Robert Bruce Moffett

It is certified that error appears in the above identified patent and that said Letters Patent are hereby corrected as shown below:

Column 1, line 70, "prosphoric" should read -- phosphoric --. Column 3, line 28, "tartaric, malic" should read -- tartaric, maleic, malic --; line 37, "methyl-3-diisobutyl" should read -- methyl-3-dibutyl --. Column 4, line 27, "zino" should read -- piperidino --.

Signed and sealed this 7th day of April 1970.

(SEAL)
Attest:

Edward M. Fletcher, Jr.

Attesting Officer

WILLIAM E. SCHUYLER, JR.

Commissioner of Patents